(12) United States Patent
Nho et al.

(10) Patent No.: US 8,388,710 B2
(45) Date of Patent: Mar. 5, 2013

(54) CERIUM OXIDE POWDER, METHOD FOR PREPARING THE SAME, AND CMP SLURRY COMPRISING THE SAME

(75) Inventors: Jun-seok Nho, Daejeon (KR); Myoung-hwan Oh, Daejeon (KR); Jang-yul Kim, Daejeon (KR); Jong-pil Kim, Daejeon (KR); Seung-beom Cho, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/076,649

(22) Filed: Mar. 20, 2008

(65) Prior Publication Data

US 2008/0236050 A1    Oct. 2, 2008

Related U.S. Application Data

(63) Continuation-in-part of application No. 11/339,841, filed on Jan. 26, 2006, now abandoned, which is a continuation of application No. PCT/KR2007/003579, filed on Jul. 26, 2007.

(30) Foreign Application Priority Data

| Jan. 26, 2005 | (KR) | 10-2005-0007153 |
| Jul. 28, 2006 | (KR) | 10-2006-0071703 |
| Jul. 28, 2006 | (KR) | 10-2006-0071713 |
| May 11, 2007 | (KR) | 10-2007-0046206 |

(51) Int. Cl.
  *B24D 3/02*    (2006.01)
  *C09C 1/68*    (2006.01)
  *C09K 3/14*    (2006.01)
  *C09K 13/00*   (2006.01)

(52) U.S. Cl. .................. 51/309; 252/79.1

(58) Field of Classification Search .......... 51/298, 51/309; 252/79.1, 79.4; 438/692
See application file for complete search history.

(56) References Cited

U.S. PATENT DOCUMENTS

| 6,053,956 A * | 4/2000 | Wood .................. 51/309 |
| 6,343,976 B1 | 2/2002 | Yoshida et al. |
| 6,420,269 B2 | 7/2002 | Matsuzawa et al. |
| 2005/0176580 A1 | 8/2005 | Osaka et al. |
| 2006/0032150 A1 | 2/2006 | So et al. |
| 2006/0150526 A1 * | 7/2006 | Ota et al. .................. 51/307 |
| 2006/0162260 A1 | 7/2006 | Nho et al. |
| 2006/0248804 A1 | 11/2006 | Yoshida et al. |
| 2008/0176982 A1 | 7/2008 | Haga et al. |

FOREIGN PATENT DOCUMENTS

| JP | 07-081932 A | 3/1995 |
| JP | 2005-39286 | 2/2005 |
| KR | 10-0403719 B1 | 10/2003 |
| KR | 1020060005794 A | 1/2006 |
| KR | 10-0574162 B1 | 4/2006 |
| WO | 01 36332 A1 | 5/2001 |
| WO | WO 2004/037722 * | 5/2004 |
| WO | WO 2004037722 A1 * | 5/2004 |

OTHER PUBLICATIONS

Taiwanese Office Action with English translation from corresponding Taiwanese Patent Application No. 96127623 dated Mar. 22, 2011, 17 pages.
Guo et al., "Synthesis and Characterization of Single-Crystal Ce(OH)CO3 and CeO2 Triangular Microplates", Inorganic Chemistry, 2006, 45, pp. 4167-4169.
Machine English translation of J2005-39286.
Hoshino et al., "Mechanism of polishing of SiO2 films by CeO2 particles", Journal of Non-Crystalline Solids, 283 (2001), 129-136.

* cited by examiner

*Primary Examiner* — Anthony J Green
*Assistant Examiner* — Pegah Parvini
(74) *Attorney, Agent, or Firm* — Rothwell, Figg, Ernst & Manbeck, P.C.

(57) ABSTRACT

Disclosed is cerium oxide powder for a CMP abrasive, which can improve polishing selectivity of a silicon oxide layer to a silicon nitride layer and/or within-wafer non-uniformity (WI-WNU) during chemical mechanical polishing in a semiconductor fabricating process. More particularly, the cerium oxide powder is obtained by using cerium carbonate having a hexagonal crystal structure as a precursor. Also, CMP slurry comprising the cerium oxide powder as an abrasive, and a shallow trench isolation method for a semiconductor device using the CMP slurry as polishing slurry are disclosed.

2 Claims, 10 Drawing Sheets

(a)

(b)

(c)

(d)

CERIUM OXIDE POWDER, METHOD FOR PREPARING THE SAME, AND CMP SLURRY COMPRISING THE SAME

This application is a continuation-in-part of U.S. patent application Ser. No. 11/339,841, filed on Jan. 26, 2006, now abandoned which claims the benefit of Korean patent application No. 10-2005-7153 filed in the Korean Industrial Property Office on Jan. 26, 2005, the content of which is incorporated hereinto by reference.

Further, this application is a continuation of PCT Patent application PCT/KR 2007/003579, filed on Jul. 26, 2007, which claims the benefit of Korean patent application Nos. 10-2006-0071713; 10-2006-0071703; and 10-2007-0046206 filed in the Korean Industrial Property Office on Jul. 28, 2006, Jul. 28, 2006 and May 11, 2007, respectively, the contents of which are incorporated hereinto by reference.

TECHNICAL FIELD

The present invention relates to cerium oxide powder for a CMP abrasive, which can improve polishing selectivity of a silicon oxide layer to a silicon nitride layer and/or within-wafer non-uniformity (WIWNU) during chemical mechanical polishing in a semiconductor fabricating process. Also, the present invention relates to CMP slurry comprising the cerium oxide powder.

BACKGROUND ART

In general, there has been a tendency to increase the diameter of a wafer in current semiconductor fabrication processes so as to accomplish high integration of a ULSI (ultralarge scale integrated circuit). Also, current semiconductor fabrication has been subjected to more strict standards including the minimum width requirement of 0.13 μm or less. Further, a step of forming a multiple interconnection or multilayer interconnection structure on a wafer is essentially required for improving the quality of a semiconductor device. However, non-planarization of wafer occurring after carrying out one of the above techniques causes many problems, such as a drop in the margin in the subsequent steps or degradation of the quality of a transistor or device. Therefore, planarization processes have been applied to various steps so as to solve such problems.

One of these planarization techniques is CMP (chemical mechanical polishing). During the process of CMP, a wafer surface is pressed against a polishing pad that rotates relative to the surface, and chemically reactive slurry is introduced into the polishing pad during the polishing process. Such a CMP technique accomplishes planarization of a wafer surface by way of chemical and physical actions.

Such a CMP technique may be applied to a shallow trench isolation (STI) process, and particularly in a step of polishing an insulating silicon oxide layer 104 until a silicon nitride etch-stop layer 102 is exposed, after depositing the insulating silicon oxide layer 104 so that a trench 103 on a wafer may be embedded therein (see (b) and (c) in FIG. 1). Herein, the silicon nitride layer has a higher strength and hardness as compared to the silicon oxide layer by about three times, and thus the polishing rate of the silicon oxide layer is higher than that of the silicon nitride layer. It is preferable that no silicon nitride layer is removed. In other words, it is ideal that the polishing rate of the silicon oxide layer to the silicon nitride layer (referred to also as 'polishing selectivity of the insulating silicon oxide layer to the silicon nitride layer' hereinafter) is infinite.

However, conventional CMP slurry has a low polishing selectivity of the insulating silicon oxide layer to the silicon nitride layer, which is about 4:1. Hence, the silicon nitride layer is polished to a degree exceeding the acceptable range in a practical CMP process. As a result, the silicon nitride layer pattern may be removed non-uniformly depending on locations in a wafer during a CMP process. Therefore, the silicon nitride etch-stop layer has a significantly variable thickness over the whole wafer. During an STI process, this causes a level difference between active regions and field regions in a final structure having a trench formed thereon, resulting in a drop in the process margin of the subsequent steps for manufacturing a semiconductor device, and degradation of the quality of a transistor and a device. Particularly, this is a serious problem in the case of a semiconductor wafer that has patterns having different densities at the same time.

In addition to the aforementioned problem of local planarization, the conventional CMP process shows low within-wafer non-uniformity (WIWNU). In other words, during the polishing according to the conventional CMP process, the central portion of a wafer is predominantly polished as compared to the circumferential portion thereof, resulting in formation of a longitudinal section having a U-like or W-like overall shape. It is thought that this is because the mechanical pressure pressurizing the wafer and polishing pad is distributed non-uniformly, so that the polishing slurry or polishing particles cannot be distributed uniformly and the central portion of the wafer is subjected to a relatively high polishing rate.

To solve the above problem related with WIWNU, a practical semiconductor fabrication process adopts a larger processing margin for a silicon nitride layer so as to ensure reliable termination of CMP. For example, the silicon nitride layer has a larger initial thickness to compensate for the difference in thickness of the silicon nitride layer between the central portion and the circumferential portion of the wafer after polishing. However, this results in degradation of the cost-efficiency of the process.

Disclosure

Technical Problem

Therefore, the present invention has been made in view of the above-mentioned problems. The inventors of the present invention have found that when cerium oxide powder obtained by calcination of cerium carbonate is used as an abrasive of CMP slurry, a polishing quality during a CMP process is significantly affected by the crystal structure of cerium carbonate.

Also, the inventors of the present invention have found that when cerium oxide powder, obtained by using cerium carbonate having a hexagonal crystal structure as a precursor, is used as an abrasive for CMP slurry, the polishing quality, especially the polishing selectivity of a silicon oxide layer to a silicon nitride layer, WIWNU, anti-scratch property and so on, can be improved.

The present invention is based on these findings.

Technical Solution

According to an aspect of the present invention, there is provided a method for preparing cerium oxide powder by using cerium carbonate having a hexagonal crystal structure as a precursor.

According to another aspect of the present invention, there is provided cerium oxide powder comprising at least 50 vol % of hexagonal plate-like or hexagonal prism-like particles having at least one edge with an angle of 120°±20°; and CMP slurry comprising the cerium oxide powder as an abrasive.

Hereinafter, the present invention will be explained in more detail.

In general, CMP slurry comprises an abrasive, a dispersant and water.

Meanwhile, generally it has been thought that polishing based on the conventional abrasive, such as cerium oxide, is performed by a mechanical polishing as a main polishing mechanism, the mechanical polishing is accomplished by repeating a series of steps including (i) hydration of the surface subjected to polishing (the resultant thereof being '—Si(OH)$_3$'); (ii) mechanical removal of the hydrated layer by an abrasive, and (iii) dispersion and dissolution of the removed silicon hydrate (Si(OH)$_4$) in a solution.

Additionally, it is disclosed in a known thesis (Journal of Non-Crystalline Solids, 283 (2001) pp 129-136) that when cerium oxide is used as an abrasive, the cerium oxide can act chemically to a silicon oxide layer. That is, the cerium oxide can polish a silicon oxide layer chemically by a mechanism wherein Si—O—Ce chemical bonding occurs due to the high reactivity between cerium oxide and silicon oxide, and cerium oxide removes silicon oxide from the surface of the silicon oxide layer in such a manner that the silicon oxide lumps are torn off.

That is, when cerium oxide is used as an abrasive, the polishing quality may be affected by the physicochemical properties of cerium oxide.

For example, specific surface area of cerium oxide may affect the polishing rate of a silicon oxide layer. Cerium oxide particles may be chemically stable because of having a complete crystal structure as the structure approaches its central region. On the contrary, the grain boundary or surface of the particles has a relatively incomplete crystal structure and high chemical reactivity, thereby being likely to receive other elements or ions. Accordingly, the polishing rate of a silicon oxide layer may be improved since the chemical reactivity is the higher if the cerium oxide powder has the smaller particle size and the higher specific surface area per unit gram.

Furthermore, hardness, size or shape of cerium oxide may affect the polishing rate of the surface subjected to polishing, the anti-scratch property, etc. As an example, the cerium oxide abrasive should have the sufficient self-hardness so as to have a high polishing rate. Also, if the cerium oxide abrasive has a high hardness and large size, there is a high possibility that micro-scratches are generated at the surface subjected to polishing.

Therefore, it is necessary to improve the physicochemical properties of cerium oxide in order to improve the polishing quality.

Under these circumstances, the present inventors have studied to improve physicochemical properties of cerium oxide by varying the crystal structure of cerium carbonate when preparing cerium oxide by using cerium carbonate.

Cerium carbonate as a precursor for cerium oxide has different crystal structures depending on the amounts of carbonate functional groups and hydroxyl groups adsorbed thereto. Therefore, even when cerium carbonate is applied to the same oxidation process for preparing cerium oxide, the resultant cerium oxide may have different crystallinities, specific surface area, pore distributions, hardness, or the like, depending on the crystal structure of cerium carbonate.

Also, according to the experiments conducted by the present inventors, when cerium oxide powder, obtained by using cerium carbonate as a precursor, is used as an abrasive for CMP slurry, the polishing quality, especially the polishing selectivity of a silicon oxide layer to a silicon nitride layer, WIWNU, anti-scratch property and so on, is significantly affected by the crystal structure of cerium carbonate used.

Based on these points, the present invention provides cerium oxide powder that can impart excellent polishing quality, especially the polishing selectivity of a silicon oxide layer to a silicon nitride layer, WIWNU, anti-scratch property and so on, as an abrasive for CMP slurry. More particularly, the present invention is characterized by using cerium oxide powder as an abrasive for CMP slurry, the cerium oxide powder being prepared by using cerium carbonate having a hexagonal crystal structure as a precursor.

Cerium oxide prepared by using cerium carbonate having a hexagonal crystal structure as a precursor may comprise grains with a uniform size bound weakly among themselves. Therefore, when such cerium oxide is used as an abrasive, the grains are crushed into a uniform size by the mechanical force applied from the polishing pad and perform polishing of the wafer surface. Thus, it is possible to provide excellent WIWNU over the whole wafer.

Additionally, such cerium oxide is more easily crushed upon polishing of silicon nitride layer having a higher hardness, so that it can be converted into small particles and can significantly reduce the polishing rate of the silicon nitride layer. Meanwhile, since the cerium oxide has a broad pore size distribution and excellent chemical surface activity, it shows an increased chemical polishing rate upon polishing of the silicon oxide layer, and maintains an excellent polishing rate while causing no significant drop in the polishing rate of the silicon oxide layer. Therefore, when the cerium oxide powder according to the present invention is used as an abrasive, it is possible to increase the polishing selectivity of the silicon oxide layer to the silicon nitride layer.

There is no particular limitation in the method for preparing the cerium oxide powder according to the present invention, as long as the method includes a step of carrying out calcination of cerium carbonate having a hexagonal crystal structure.

Herein, there is no particular limitation in the cerium carbonate, as long as the cerium carbonate has a hexagonal crystal structure. Any cerium carbonate generally known to those skilled in the art may be used. The cerium carbonate may be obtained by using the conventional method currently used in the art. For example, the cerium carbonate may be prepared by carrying out precipitation between cerium nitrate and ammonium carbonate, or by carrying out a hydrothermal reaction between them under high pressure.

Additionally, there is no particular limitation in the particle size of the cerium carbonate having a hexagonal crystal structure. Preferably, the cerium carbonate has an average particle diameter of 0.1~20 μm. If the cerium carbonate has an average diameter of less than 0.1 μm, the resultant cerium oxide powder may have an average diameter of less than 30 nm, resulting in a significant drop in the polishing rate. If the cerium carbonate has an average diameter of greater than 20 μm, the resultant cerium oxide powder has a broad particle size distribution.

Meanwhile, the calcination step may be carried out by heat treating the cerium carbonate at a temperature of 200~600° C. for 6~100 hours. If the calcination temperature is lower than 200° C., complete phase transition from cerium carbonate to cerium oxide cannot be accomplished. If the calcination temperature is higher than 600° C., the resultant cerium oxide has an undesirably high hardness, so that the silicon nitride layer may be subjected to a high polishing rate (the polishing selectivity of the silicon oxide layer to the silicon nitride layer decreases), or the surface subjected to polishing may cause micro-scratches.

Furthermore, after the above mentioned calcination step (referred to also as 'first calcination' hereinafter), there is preferred to carry out the second calcination step of the powder obtained from the first calcination step at a temperature higher than the first calcination temperature.

When the powder obtained from the first calcination step is subjected to the second calcination (heat treatment) step in this manner, powder having a broad pore size distribution may be formed. Therefore, when the resultant cerium oxide powder is used as an abrasive, it is possible to improve the polishing selectivity of the silicon oxide layer to the silicon nitride layer and/or WIWNU.

The second calcination (heat treatment) step may be performed at a temperature of 600~1,200° C., and preferably of 800~900° C. for 30 minutes~6 hours. If the second calcination temperature is out of the above range, the polishing rate of the silicon nitride layer may increase.

Although the first and the second calcination steps may be carried out in the air, calcination under oxygen atmosphere is preferred. Additionally, calcination may be carried out by using conventional heaters, such as a box type furnace, an automatic conveyance type continuous furnace or a rotary continuous furnace.

Meanwhile, the method for preparing cerium oxide according to the present invention may optionally further comprise a step of crushing the powder obtained from the calcination step, after the first calcination step.

The crushing step is for pre-treating coarse particles by pulverizing them so as to allow the subsequent reaction can be performed more uniformly in the second calcination step or the polishing step. The cerium oxide powder obtained from the crushing step may have an average diameter of 0.03~0.2 μm.

Any conventional crushing method known to those skilled in the art can be used with no particular limitation, and a dry crushing method is preferred. Non-limiting examples of such methods include a jet mill process, disk mill process, beads mill process, or the like.

The cerium oxide powder obtained by using cerium carbonate having a hexagonal crystal structure as a precursor according to the present invention may have a hexagonal plate-like or hexagonal prism-like particle shape.

The inventors of the present invention have studied about cerium oxide powder and have found that cerium oxide powder prepared via a solid phase process frequently maintains the shape and size of cerium carbonate particles used as a precursor. The cerium oxide powder according to the present invention is obtained by using cerium carbonate having a hexagonal crystal structure as a precursor, and such cerium carbonate having a hexagonal crystal structure frequently has a hexagonal plate-like or hexagonal prism-like particle shape. Thus, the cerium oxide powder according to the present invention may have a hexagonal plate-like or hexagonal prism-like particle shape (Refer to FIG. 4 and FIG. 5).

Therefore, the cerium oxide powder according to the present invention may include hexagonal plate-like or hexagonal prism-like particles having at least one edge with an angle of 120°±20°, and preferably of 120°±10°. Additionally, the cerium oxide powder may comprise at least 50 vol % of the hexagonal plate-like or hexagonal prism-like particles, based on the total volume thereof; or at least 1 vol % of the hexagonal plate-like or hexagonal prism-like particles, based on the total volume thereof in case of being carried out crushing step. Such proportion can be determined statistically from multiple sheets of photographs taken by scanning electron microscopy (SEM).

Especially, such shape of the cerium oxide powder according to the present invention may helpfully act on anti-scratch property to the surface subjected to polishing. That is, a conventional cerium oxide, which is obtained by using cerium carbonate having an orthorhombic crystal structure as a precursor, may mostly have a stick-like particle shape. Thus, when cerium oxide obtained from cerium carbonate having an orthorhombic crystal structure is used as an abrasive, the cerium oxide is broken and changes to a needle-like shape in polishing step, thereby generating scratches to the surface subjected to polishing. On the other hand, the cerium oxide according to the present invention may rarely have a needle-shape although being broken in polishing step, since the cerium oxide powder has a hexagonal plate-like or hexagonal prism-like particle shape. Thus, when the cerium oxide powder according to the present invention is used as an abrasive, anti-scratch property to the surface subjected to polishing is improved, as compared to cerium oxide powder obtained from cerium carbonate having an orthorhombic crystal structure.

Meanwhile, the cerium oxide powder according to the present invention preferably has a mean crystallite size of 1 nm~60 nm. If the mean crystallite size is less than 1 nm, polishing rate decreases. If the mean crystallite size is greater than 60 nm, the surface subjected to polishing may be severely scratched. The crystallite size is calculated by using the Scherrer Equation after measuring the half width of the main peak of cerium oxide with an X-ray diffractometer; or by a square root of product of the longest particle diameter and the short particle diameter after measuring a diameter of particle with a transmission electron microscope (TEM). Also, a mean value of the crystallite size is referred to as a value of crystallite size where a cumulative percent of particle volumes obtained from sizes of the particles reaches 50%.

Meanwhile, the CMP slurry according to the present invention comprises an abrasive, a dispersant and water, wherein the abrasive is cerium oxide powder obtained by using cerium carbonate having a hexagonal crystal structure as a precursor.

The cerium oxide powder is preferably used in an amount of 0.1~50 parts by weight per 100 parts by weight of the slurry. If the abrasive, cerium oxide powder, is used in an amount of less than 0.1 parts by weight, the polishing rate of the silicon oxide layer may significantly decrease. If the cerium oxide powder is used in an amount of greater than 50 parts by weight, the resultant slurry may have an undesirably high viscosity, and thus cannot be present as stable slurry during the dispersion and polishing steps.

The dispersant that may be used in the present invention includes a non-ionic polymeric dispersant or an anionic polymeric dispersant. The non-ionic polymeric dispersant includes at least one compound selected from the group consisting of polyvinyl alcohol (PVA), ethylene glycol (EG), glycerin, polyethylene glycol (PEG), polypropylene glycol (PPG) and polyvinyl pyrrolidone (PVP). The anionic polymeric dispersant includes at least one compound selected from the group consisting of polyacrylic acid, ammonium polyacrylate and polyacrylmaleic acid. However, the scope of the present invention is not limited thereto.

The dispersant is preferably used in an amount of 0.0001~10 parts (more preferably 0.02~3 parts) by weight per 100 parts by weight of the abrasive. If the dispersant is used in an amount of less than 0.0001 parts by weight, the slurry has lower dispersibility and causes rapid precipitation. Thus, the abrasive cannot be supplied uniformly while the polishing slurry is conveyed due to such precipitation (solid-liquid separation). If the dispersant is used in an amount of greater than 10 parts by weight, it is not possible to realize a sufficient level of polishing selectivity during the polishing step.

Preferably, the CMP slurry is titrated to pH 6~8 after the cerium oxide powder and the dispersant are mixed with water. For the titration, 1N KOH or 1N $HNO_3$ may be used.

After the completion of the titration, it is preferable to perform a dispersion stabilization step to improve the dispersion stability and shelf stability of the CMP slurry. The dispersion stabilization step is preferably performed via a wet crushing/dispersion process capable of controlling the particle size finely and accurately. Such processes include a ball mill process, attrition mill process, or the like.

Herein, in the finally formed CMP slurry obtained after the dispersion stabilization step, the cerium oxide powder preferably has a maximum particle size of less than 3 μm and an average particle diameter of 30~1,000 nm. If the cerium oxide powder has an average particle diameter of less than 30 nm, the polishing rate of the surface subjected to polishing is too low. If the cerium oxide powder has an average particle diameter of greater than 1,000 nm, the polishing rate of the silicon nitride layer increases (the polishing selectivity decreases), the surface causes micro-scratches, or the slurry has low shelf stability. The above particle size is measured by using a particle size distribution measuring system (Horiba LA-910).

The CMP slurry according to the present invention comprises the abrasive, the dispersant and other additives, each in a predetermined amount, and further comprises the balance amount of water.

Meanwhile, the CMP slurry according to the present invention may further comprise additives for improving the polishing quality. Such additives include a monomer substance having a weight average molecular weight of 500 or less and containing either or both of hydroxyl (OH) groups and carboxyl groups (COOH), a linear polymer substance having a weight average molecular weight of 2,000~50,000, or a graft type polyelectrolyte having a weight average molecular weight of 1,000~20,000, but are not limited thereto.

Further, the CMP slurry according to the present invention is used as polishing slurry for an STI (shallow trench isolation) method. The STI method may be performed according to a process currently used in the art.

For example, the STI method comprises the steps of:

(a) stacking a pad silicon oxide ($SiO_2$) layer 101 and a silicon nitride etch-stop layer 102 successively on a semiconductor wafer 100, forming a photoresist pattern, and partially etching the photoresist pattern by using a mask to form trenches 103 having a predetermined depth;

(b) depositing an insulating silicon oxide layer 104 so that the trenches are embedded therein;

(c) polishing (CMP) the insulating silicon oxide layer 104 until the silicon nitride etch-step layer 102 is exposed; and (d) removing the pad silicon oxide layer 101 and the silicon nitride etch-step layer 102 via etching, and forming a gate silicon oxide layer 105 on the semiconductor wafer.

In case of the STI method according to the present invention, the polishing quality, especially the polishing selectivity of a silicon oxide layer to a silicon nitride layer, WIWNU, and so on, can be improved as the above-mentioned. More particularly, when cerium oxide powder prepared by using cerium carbonate having a hexagonal crystal structure as a precursor is used as an abrasive for CMP slurry according to the present invention, the polishing selectivity of the silicon oxide layer to the silicon nitride layer may be at least 30, and the delta WIWNU (within-Wafer Non-Uniformity) (%) may be 10% or less. The above polishing selectivity and WIWNU are improved when compared to the polishing quality obtained by using cerium oxide powder prepared from cerium carbonate having an orthorhombic crystal structure or lanthanite-(Ce) cerium carbonate as a precursor. Herein, the delta WIWNU (%) is defined as the standard deviation in thickness of a wafer divided by the average thickness after polishing. Generally, a lower delta WIWNU value indicates a higher planarization degree.

BRIEF DESCRIPTION OF THE DRAWINGS

The foregoing and other objects, features and advantages of the present invention will become more apparent from the following detailed description when taken in conjunction with the accompanying drawings in which.

MODE FOR INVENTION

Reference will now be made in detail to the preferred embodiments of the present invention. It is to be understood that the following examples are illustrative only and the present invention is not limited thereto.

EXAMPLE 1

<Preparation of Cerium Oxide Powder>

Figure 1:
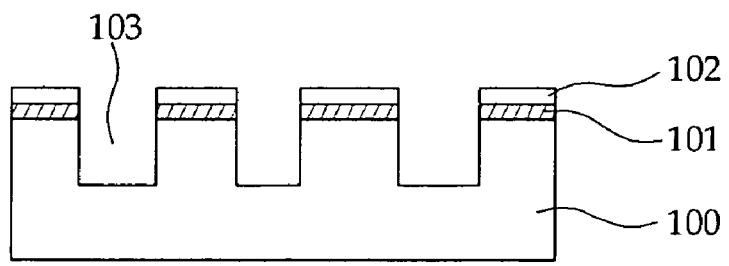
FIG. 1 is a schematic view showing a conventional shallow trench isolation (STI) process:
100: a semiconductor wafer
101: a pad silicon oxide ($SiO_2$) layer
102: a silicon nitride etch-stop layer
103: a trench
104: a insulating silicon oxide layer
105: a gate silicon oxide layer 105.
Figure 1:
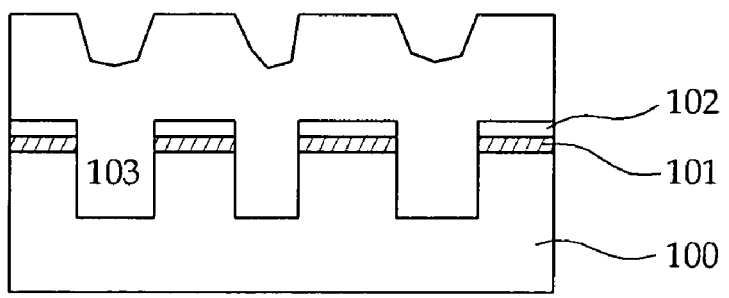
Figure 1:
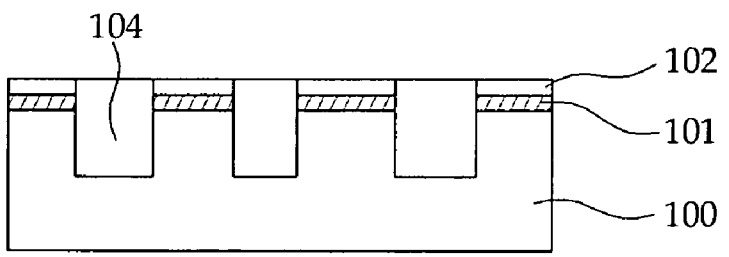
Figure 1:
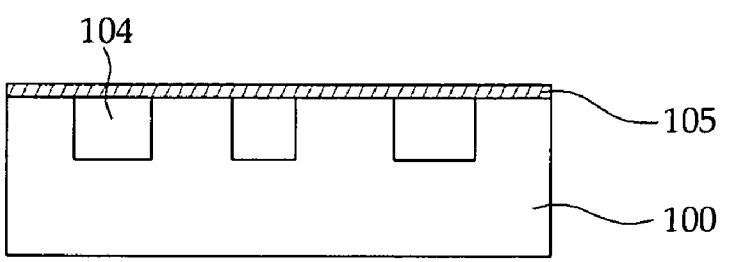
Figure 2:
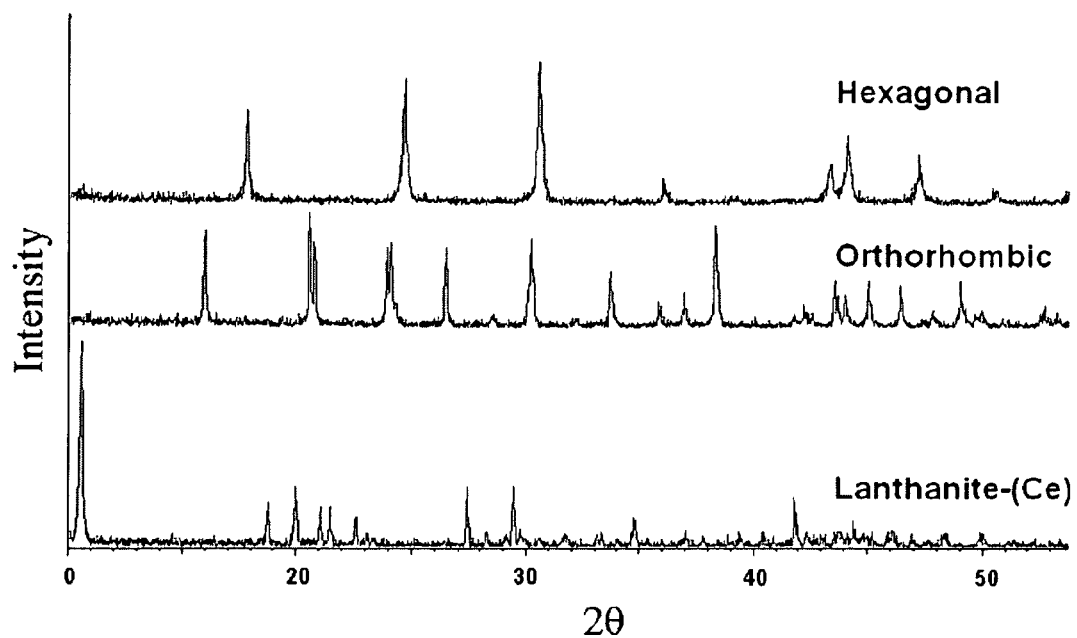
FIG. 2 is the X-ray diffraction (XRD) diagram of the cerium carbonate used as a precursor for cerium oxide powder according to the examples and comparative examples.

First, 1 kg of cerium carbonate powder having a hexagonal crystal structure (see XRD data in FIG. 2) was charged into an alumina crucible, was calcined at 350° C. for 12 hours under oxidative atmosphere to which air is fed sufficiently, and was crushed by using a jet mill. The crushed powder is further calcined at 750° C. for 2 hours to obtain light yellow-colored cerium oxide powder.

Figure 3:
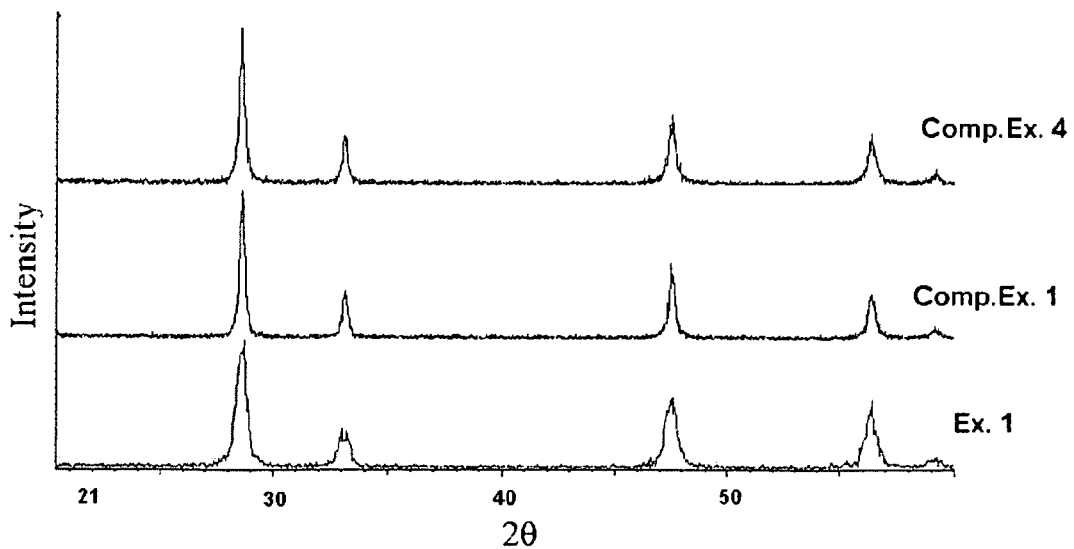
FIG. 3 is the X-ray diffraction (XRD) diagram of the cerium oxide powder obtained according to examples 1~3 and comparative examples 1~6.

After analyzing the powder by XRD, it can be seen that a complete phase transition from cerium carbonate into cerium oxide is accomplished, as shown in FIG. 3.

Figure 4:
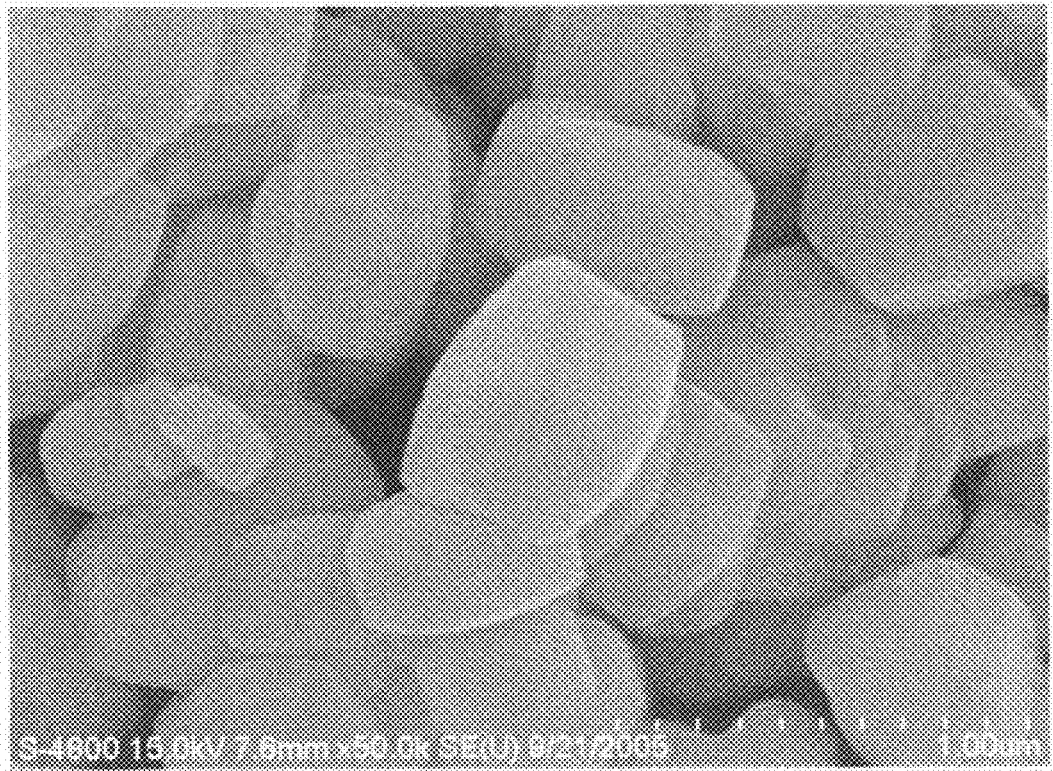
FIG. 4 is a photographic view of the cerium carbonate powder used in Example 1, taken by scanning electron microscopy (SEM).
Figure 5:
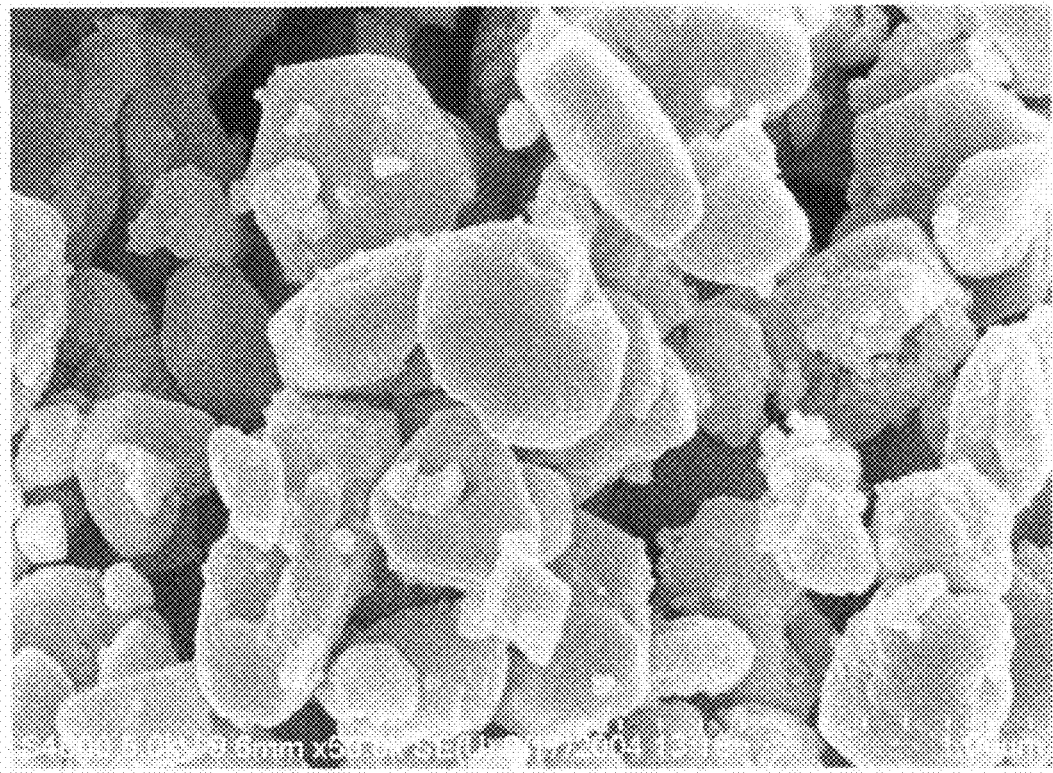
FIG. 5 is a photographic view of the cerium oxide powder obtained from Example 1, taken by SEM.

Photographs of the cerium carbonate powder and the cerium oxide powder taken by SEM are shown in FIG. 4 and FIG. 5, respectively.

<Preparation of CMP Slurry>

A cerium oxide dispersion was prepared by using 0.5 kg of the cerium oxide powder obtained as described above, 25 g of a dispersant (polyacrylic acid available from Aldrich) and 5 L of pure water. The cerium oxide dispersion was titrated to pH 7.5 with aqueous ammonia, and subjected to a dispersion stabilization and particle size modification step using a ball mill. Herein, 1 kg of zirconia beads with a size of 1 mm were used in the ball mill and the ball mill was operated at a speed of 250 rpm for 2 hours.

The cerium oxide dispersion was filtered with a 1 µm filter, and pure water was added thereto so that the content of the cerium oxide is 1 part by weight per 100 parts by weight of the total mixture to provide cerium oxide slurry. The cerium oxide had an average particle diameter of 180 nm and a particle size distribution of about 70~300 nm, as measured by using a particle size distribution measuring system (Horiba LA-910).

Meanwhile, ammonium hydroxide ($NH_4OH$) was added to 1 wt % of aqueous gluconic acid solution to a pH of 7.2 to form a mixed gluconic acid solution.

Then, 2 parts by weight of the mixed gluconic acid solution was mixed with 100 parts by weight of the cerium oxide powder to provide final CMP slurry.

EXAMPLE 2

Cerium oxide powder and CMP slurry comprising the same were provided in the same manner as described in Example 1, except that the second calcination step was carried out at 850° C. for 2 hours. The cerium oxide powder dispersed in the CMP slurry had an average particle diameter of 176 nm and a particle size distribution of 70~300 nm.

EXAMPLE 3

Cerium oxide powder and CMP slurry comprising the same were provided in the same manner as described in Example 1, except that the second calcination step was carried out at 950° C. for 2 hours. The cerium oxide powder dispersed in the CMP slurry had an average particle diameter of 182 nm and a particle size distribution of 70~300 nm.

Comparative Example 1

Cerium oxide powder and CMP slurry comprising the same were provided in the same manner as described in Example 1, except that cerium carbonate having an orthorhombic crystal structure (see XRD data in FIG. 2) was used for preparing the cerium oxide powder.

XRD analysis results of the cerium oxide are shown in FIG. 3.

Figure 6:
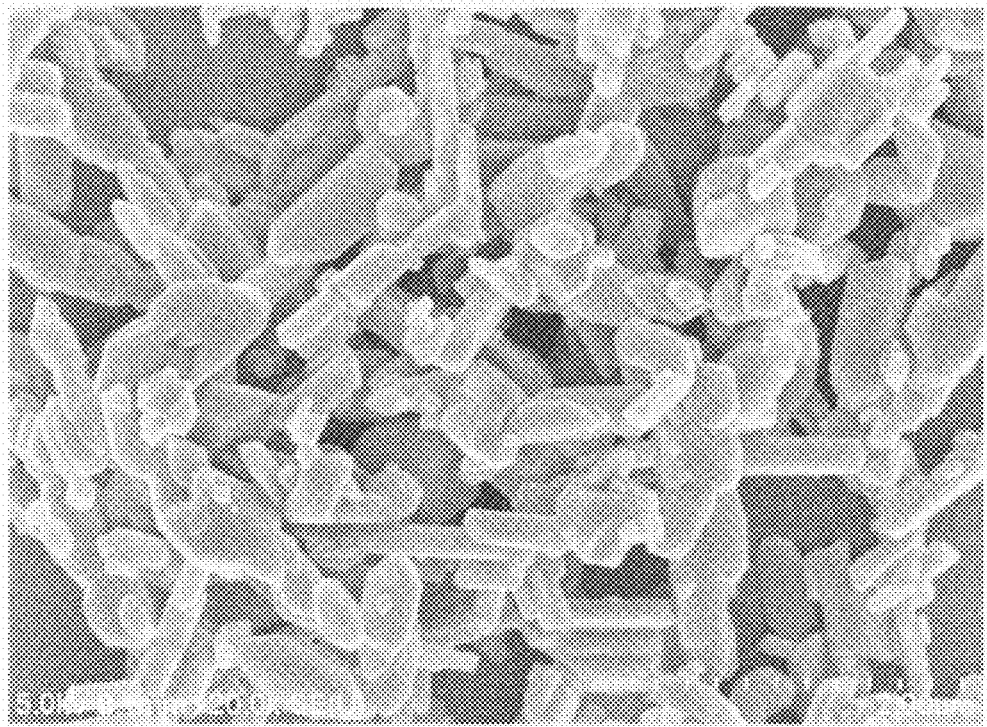
FIG. 6 is a photographic view of the cerium carbonate powder used in comparative Example 1, taken by SEM.
Figure 7:
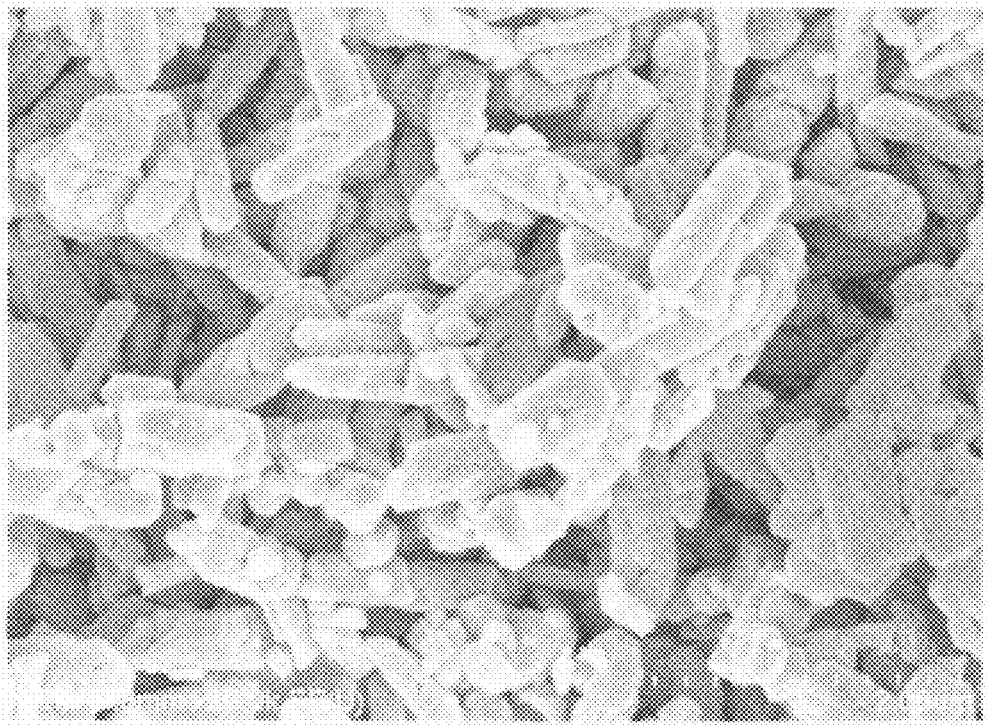
FIG. 7 is a photographic view of the cerium oxide powder obtained from comparative Example 1, taken by SEM.

Photographs of the cerium carbonate powder and the cerium oxide powder taken by SEM are shown in FIG. 6 and FIG. 7, respectively.

Meanwhile, the cerium oxide powder dispersed in the CMP slurry had an average particle diameter of 188 nm and a particle size distribution of 70~300 nm.

Comparative Example 2

Cerium oxide powder and CMP slurry comprising the same were provided in the same manner as described in Comparative Example 1, except that the second calcination step was carried out at 850° C. for 2 hours. The cerium oxide powder dispersed in the CMP slurry had an average particle diameter of 181 nm and a particle size distribution of 70~300 nm.

Comparative Example 3

Cerium oxide powder and CMP slurry comprising the same were provided in the same manner as described in Comparative Example 1, except that the second calcination step was carried out at 950° C. for 2 hours. The cerium oxide powder dispersed in the CMP slurry had an average particle diameter of 184 nm and a particle size distribution of 70~300 nm.

Comparative Example 4

Cerium oxide powder and CMP slurry comprising the same were provided in the same manner as described in Example 1, except that lanthanite-(Ce) cerium carbonate (see XRD data in FIG. 2) was used for preparing the cerium oxide powder.

XRD analysis results of the cerium oxide are shown in FIG. 3.

Meanwhile, the cerium oxide powder dispersed in the CMP slurry had an average particle diameter of 183 nm and a particle size distribution of 70~300 nm.

Comparative Example 5

Cerium oxide powder and CMP slurry comprising the same were provided in the same manner as described in Comparative Example 4, except that the second calcination step was carried out at 850° C. for 2 hours. The cerium oxide powder dispersed in the CMP slurry had an average particle diameter of 180 nm and a particle size distribution of 70~300 nm.

Comparative Example 6

Cerium oxide powder and CMP slurry comprising the same were provided in the same manner as described in Comparative Example 1, except that the second calcination step was carried out at 950° C. for 2 hours. The cerium oxide powder dispersed in the CMP slurry had an average particle diameter of 181 nm and a particle size distribution of 70~300 nm.

Experimental Example 1

Evaluation of Polishing Quality of CMP Slurries 1

The CMP slurry according to Examples 1~3 and Comparative Examples 1~6 was used in a polishing step for 1 minute under the following conditions. The substrate was washed thoroughly to measure the variation in the thickness after the polishing and to evaluate the polishing quality. The results are shown in the following Table 1.

[Polishing Conditions]
Polishing system: GNP POLY 400 (GNP Technology)
Polishing pad: polyurethane pad
Platen speed: 90 rpm
Carrier speed: 90 rpm
Pressure: 4 psi (about 280 g/cm$^2$)
Slurry flow rate: 100 ml/min.

[Objects to be Polished]
A silicon oxide ($SiO_2$) wafer on which a $SiO_2$ layer is deposited to 7000 Å from PECVD (plasma-enhanced chemical vapor deposition)
A silicon nitride (SiN) wafer on which a SiN layer is deposited to 1500 Å from LPCVD (low pressure chemical vapor deposition)

[Evaluation]
The variation in the thickness of each layer after polishing was measured by using an optical thickness measuring system, i.e. Nanospec 6100 (Nanometrics Co.).

Delta uniformity (Delta Within Wafer Non-Uniformity) was calculated according to the Standard Deviation Uniformity (ASTM).

It can been seen from the above experimental results that WIWNU is significantly affected by the crystal structure of cerium carbonate. Particularly, the CMP slurries of Examples 1~3 using the cerium oxide powder obtained from cerium carbonate having a hexagonal crystal structure according to the present invention shows a delta WIWNU value improved by about 4~10 times as compared to the CMP slurries of Comparative Examples 1~6.

Additionally, it can been seen from the above experimental results that the polishing selectivity of the silicon oxide layer to the silicon nitride layer is different depending on the crystal structure of cerium carbonate, even though cerium oxide prepared by calcinating cerium carbonate under the same oxidation condition is used as an abrasive respectively. Especially, it is showed that when the cerium oxide powder obtained by using cerium carbonate having a hexagonal structure as a precursor is used as an abrasive, the polishing selectivity is improved, as compared to other cerium oxide powder obtained from cerium carbonate having a different crystal structure.

According to the experiments, while the polishing rates of the silicon nitride layer and silicon oxide layer increase as the calcination temperature of calcium carbonate increases, the polishing selectivity and WIWNU does not significantly depend on the calcination temperature of cerium carbonate but are significantly affected by the crystal structure of cerium carbonate. It could be seen from the experimental results that the polishing selectivity and WIWNU are affected by the crystal structure of cerium carbonate rather than the calcination condition of cerium carbonate.

Experimental Example 2

Evaluation of Physicochemical Properties of Cerium Oxide

EXAMPLE 4

A hexagonal plate-like or hexagonal prism-like cerium carbonate powder having a hexagonal structure, manufactured using a high-pressure precipitation method and washed with distilled water and ethanol three and more times, was dried in a drying oven at 100° C. for 24 hours. 1 kg of the dried powder was charged into an alumina crucible and was calcinated at 200° C. for 6 hours under oxidation condition to which air is fed sufficiently. After analyzing the obtained powder by XRD, it can be seen that a complete phase transition from cerium carbonate into cerium oxide is accomplished.

TABLE 1

| Item | Crystal structure of cerium carbonate | first calcination | Second calcination | Polishing rate of silicon oxide layer (Å/min) | Polishing rate of silicon nitride layer (Å/min) | Polishing selectivity | Delta WIWNU (%) |
|---|---|---|---|---|---|---|---|
| Ex. 1 | Hexagonal | 350° C. | 750° C. | 3444 | 88 | 39 | 5.14 |
| Ex. 2 | Hexagonal | 350° C. | 850° C. | 4099 | 95 | 43 | 2.78 |
| Ex. 3 | Hexagonal | 350° C. | 950° C. | 4118 | 124 | 33 | 6.14 |
| Comp. Ex. 1 | Orthorhombic | 350° C. | 750° C. | 3772 | 130 | 29 | 12.4 |
| Comp. Ex. 2 | Orthorhombic | 350° C. | 850° C. | 4222 | 324 | 13 | 17.4 |
| Comp. Ex. 3 | Orthorhombic | 350° C. | 950° C. | 4978 | 963 | 5 | 26.7 |
| Comp. Ex. 4 | Lanthanite-(Ce) | 350° C. | 750° C. | 3677 | 108 | 34 | 12.60 |
| Comp. Ex. 5 | Lanthanite-(Ce) | 350° C. | 850° C. | 4327 | 114 | 38 | 12.14 |
| Comp. Ex. 6 | Lanthanite-(Ce) | 350° C. | 950° C. | 4414 | 184 | 24 | 16.7 |

As a result of TEM observation of the obtained powder, a mean crystallite size is in the range of less than 5 nm. A specific surface area measured by a BET method (Brunauer, Emmett, Teller) was 185 m²/g.

EXAMPLE 5~8

As noted in Table 2, cerium oxide powder was prepared in the same manner as described in Example 1, except that a different oxidation condition is applied respectively.

A mean crystallite size and a specific surface area of the obtained powder are measured by TEM observation and a BET method, respectively. The results are shown in the following Table 2.

Comparative Example 7

Figure 8:
FIG. 8 is a SEM photographic view of the conventional cerium carbonate powder used in Comparative Example 7, which has an orthorhombic crystal structure.
Figure 9:
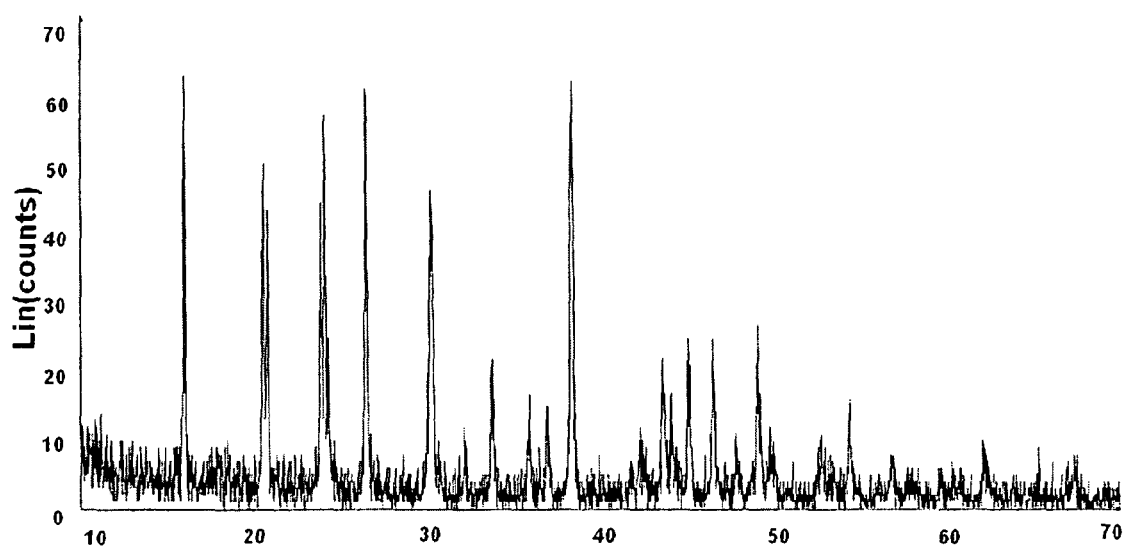
FIG. 9 is the X-ray diffraction (XRD) diagram of the conventional cerium carbonate powder used in Comparative Example 7, which has an orthorhombic crystal structure.
Figure 10:
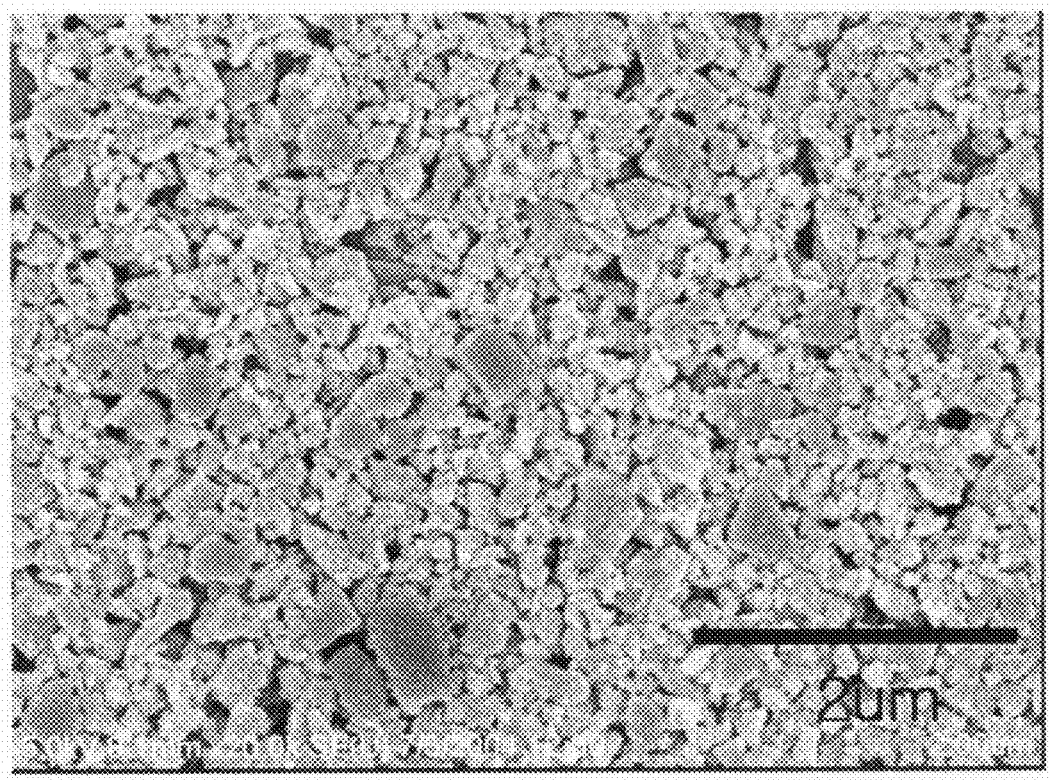
FIG. 10 is a SEM photographic view of the cerium oxide abrasive obtained from Example 4, and crushed and dispersed according to the method of Experimental Example 3.
Figure 11:
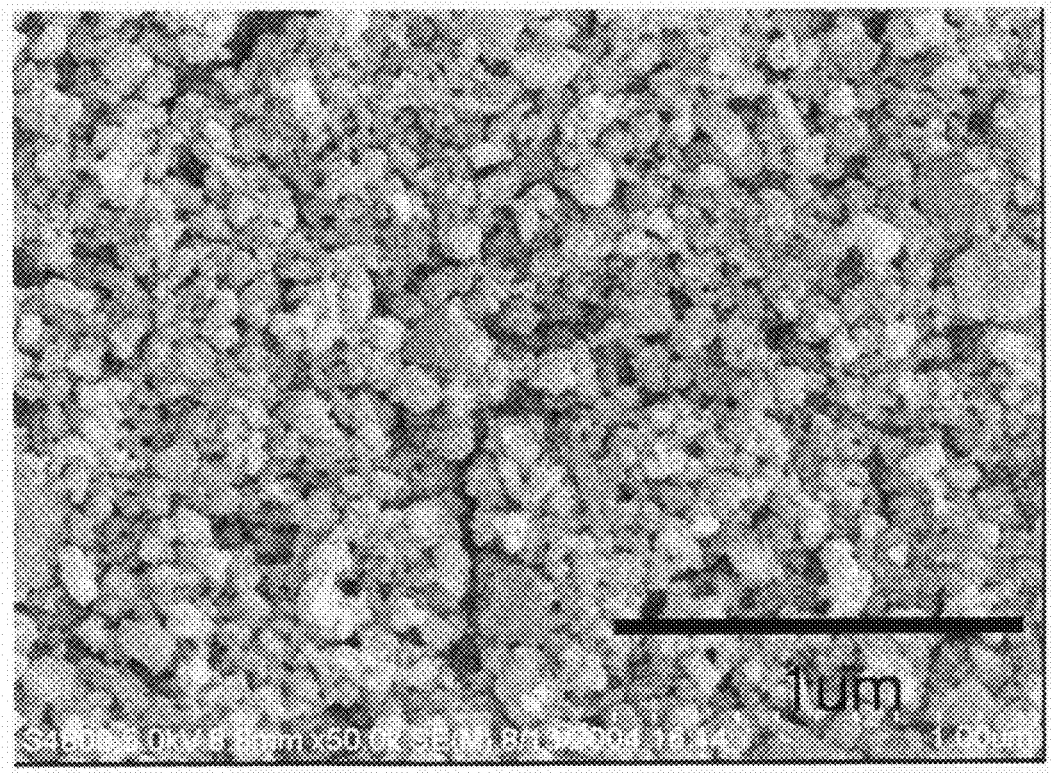
FIG. 11 is a SEM photographic view of the cerium oxide abrasive obtained from Example 5, and crushed and dispersed according to the method of Experimental Example 3.
Figure 12:
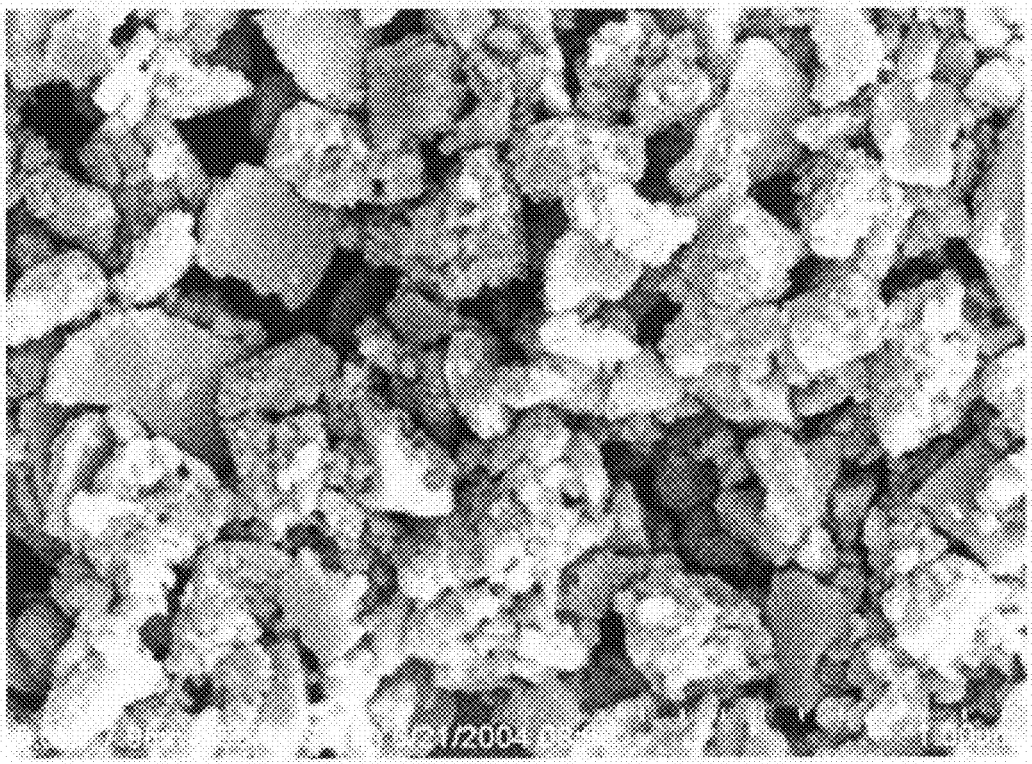
FIG. 12 is a SEM photographic view of the cerium oxide abrasive obtained from Example 6, and crushed and dispersed according to the method of Experimental Example 3.
Figure 12:
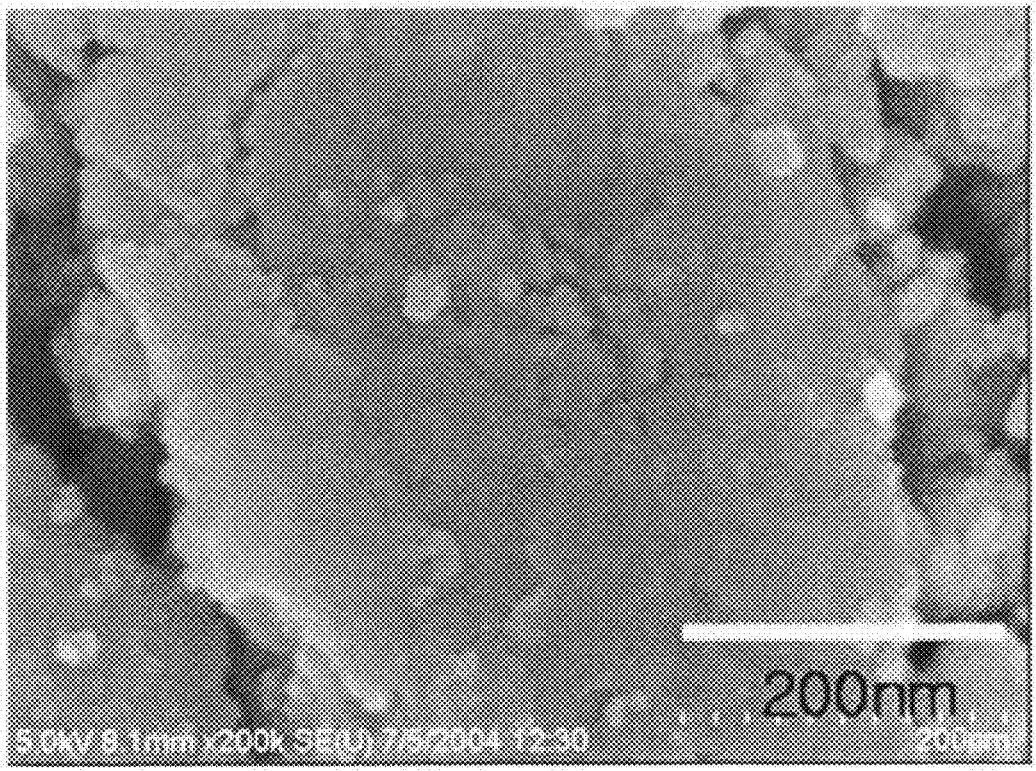
Figure 13:
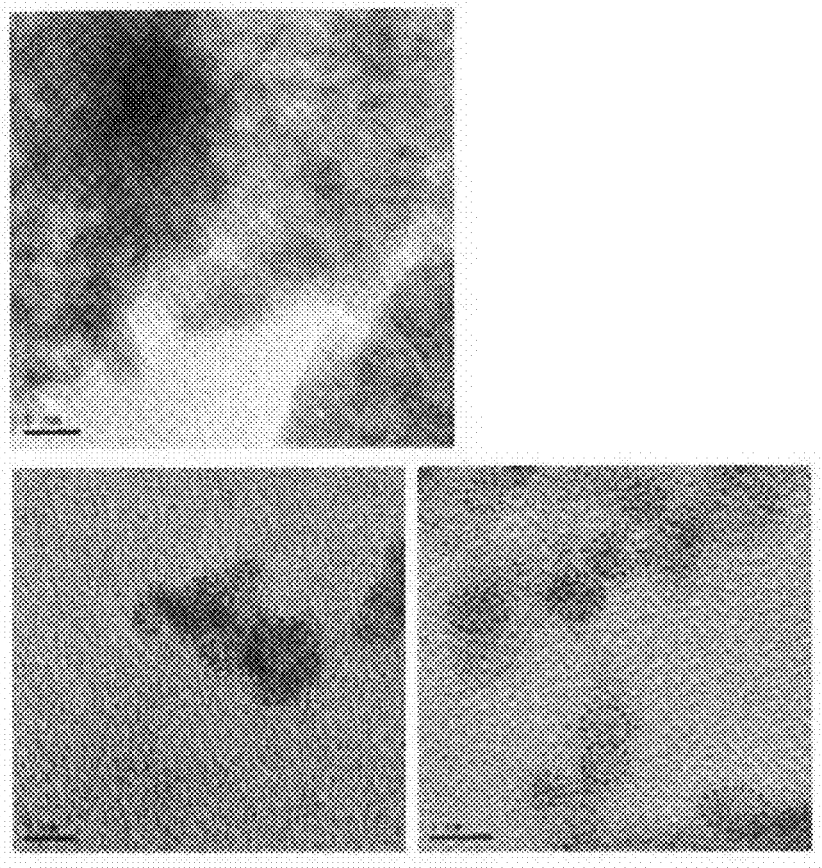
FIG. 13 is a TEM photographic view of the cerium oxide abrasive obtained from Example 6, and crushed and dispersed according to the method of Experimental Example 3.
Figure 14:
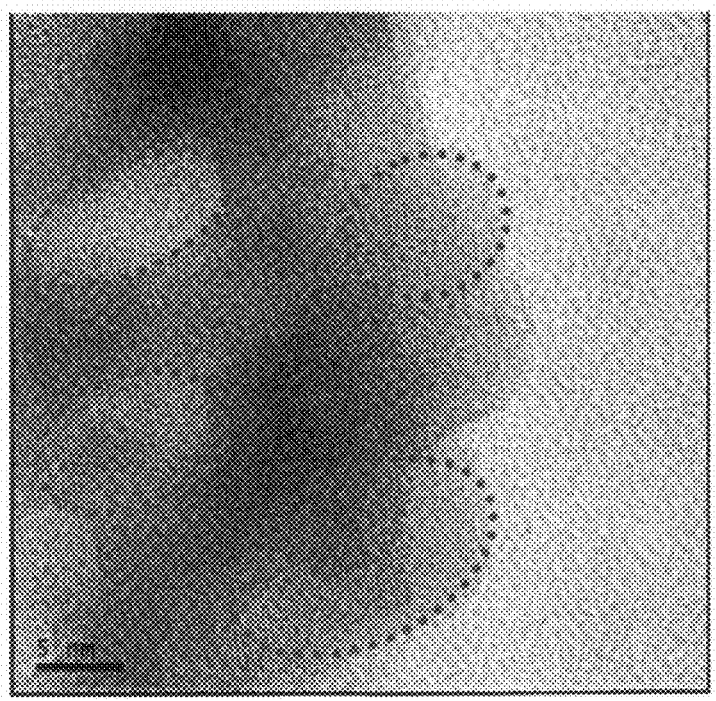
FIG. 14 is a TEM photographic view of the cerium oxide abrasive obtained from Comparative Example 7, and crushed and dispersed according to the method of Experimental Example 3.
Figure 15:
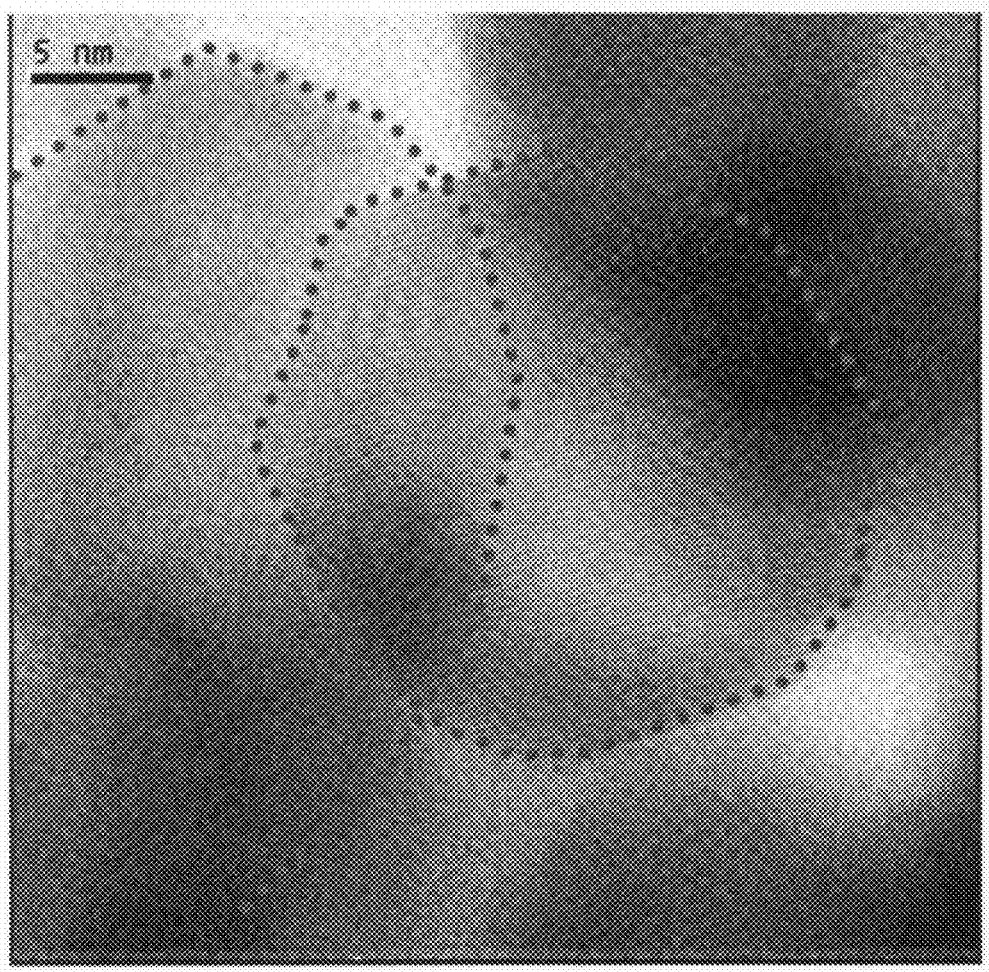
FIG. 15 is a TEM photographic view of the cerium oxide abrasive obtained from Comparative Example 8, and crushed and dispersed according to the method of Experimental Example 3.

A conventional cerium carbonate powder (the company, Sineng) was dried in a drying oven at 100° C. for 24 hours. It was confirmed that the cerium carbonate has an orthorhombic crystal structure, though TEM and SEM observation (see FIG. 8 and FIG. 9).

1 kg of the dried powder was charged into an alumina crucible and was calcinated at 400° C. for 1 hours under oxidation condition to which air is fed sufficiently, to manufacture a light yellow cerium oxide. After analyzing the obtained powder by XRD, it can be seen that a complete phase transition from cerium carbonate into cerium oxide is accomplished.

As a result of TEM observation of the obtained powder, a mean crystallite size is in the range of at least 5 nm. A specific surface area measured by a BET method was 47.2 m²/g.

Comparative Example 8

Cerium oxide powder was prepared in the same manner as described in Comparative Example 7, except that the cerium carbonate powder was calcinated at 600° C. for 30 minutes.

A mean crystallite size and a specific surface area of the obtained powder are measured by TEM observation and a BET method, respectively. The results are shown in the following Table 2.

Experimental Example 3

Evaluation of Polishing Quality of CMP Slurries 2

After each of the cerium oxide powder obtained according to examples 4~8 and comparative examples 7~8 was subjected to first-crushing, 500 g of the first-crushed powder was mixed with 10 g of a dispersant (polyacrylic acid available from Aldrich) and 5 L of pure water to provide a cerium oxide dispersion. The cerium oxide dispersion was titrated to pH 7.5 with aqueous ammonia, and subjected to second-crushing. The cerium oxide dispersion was filtered with a 1 μm filter, and pure water was added thereto so that the content of the cerium oxide is 1 part by weight per 100 parts by weight of the total mixture to provide CMP slurry.

A particle size of the cerium oxide abrasive crushed and dispersed as the above method was measured by using a particle size distribution measuring system (Horiba LA-910), and the results are shown in the following Table 2. Some of photographs of the cerium oxide powder taken by SEM and TEM are shown in FIGS. 10~15.

Each of the above-prepared CMP slurries was used in a polishing step for 1 minute under the same conditions as described in Experimental Example 1. The substrate was washed thoroughly to measure the variation in the thickness after the polishing and to evaluate the polishing quality. The results are shown in the following Table 2.

[Objects to be Polished]

A silicon oxide ($SiO_2$) wafer on which a $SiO_2$ layer is deposited to 7000 Å from PECVD (plasma-enhanced chemical vapor deposition)

[Evaluation]

The variation in the thickness of each layer after polishing was measured by using an optical thickness measuring system, i.e. Nanospec 6100 (Nanometrics Co.).

TABLE 2

|  | oxidation condition | mean crystallite size | specific surface area (m²/g) | Abrasive particle size distribution (nm) | Mean abrasive particle size (nm) | polishing rate of the silicon oxide layer (Å/min) | Presence of micro-scratch |
|---|---|---|---|---|---|---|---|
| Ex. 4 | 200° C., 6 h | Less than 5 nm | 185 | 50~200 | 92 | 3552 | No |
| Ex. 5 | 300° C., 2 h | Less than 5 nm | 143.7 | 50~200 | 95 | 3763 | No |
| Ex. 6 | 400° C., 1 h | Less than 5 nm | 101 | 50~300 | 107 | 3842 | No |
| Ex. 7 | 500° C., 30 min | Less than 5 nm | 81.7 | 50~300 | 110.7 | 4052 | No |
| Ex. 8 | 600° C., 10 min | Less than 5 nm | 79.6 | 50~450 | 156.2 | 4528 | No |
| Comp. Ex. 7 | 400° C., 1 h | At least 5 nm | 47.2 | 50~300 | 139 | 1923 | Yes |
| Comp. Ex. 8 | 600° C., 30 min | At least 20 nm | 25.7 | 50~300 | 130 | 2533 | Yes |

According to the experiments, even though cerium carbonate applies the same oxidation condition for preparing cerium oxide, the resultant cerium oxide may have different mean crystallite size, specific surface area, or the like, depending on the crystal structure of cerium carbonate.

Furthermore, when the cerium oxide powder obtained from cerium carbonate having a hexagonal crystal structure is used as an abrasive according to the present invention, the polishing rate of the silicon oxide layer was higher, as well as the micro-scratches were free.

Industrial Applicability

As can be seen from the foregoing, the cerium oxide powder according to the present invention is obtained by using cerium carbonate having a hexagonal crystal structure. When the cerium oxide powder is used as an abrasive for CMP slurry, it is possible to improve the polishing quality, especially selectivity of the silicon oxide layer to the silicon nitride layer, WIWNU, anti-scratch property and so on.

Additionally, such improved planarization of a wafer for fabricating a semiconductor device can improve the reliability and productivity of the device, and can contribute to improvement in integration degrees of ultra-miniature semiconductor devices.

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A method for preparing a cerium oxide powder consisting of:
   providing cerium carbonate having a hexagonal crystal structure and an average particle diameter of 0.1~20 μm as precursor for said cerium oxide powder,
   carrying out a first calcination of said cerium carbonate having a hexagonal crystal structure at a temperature of 200~600° C. for 6~100 hours to obtain a calcinated powder,
   crushing the calcinated powder obtained from the first calcination, and
   carrying out a second calcination of the powder obtained from the crushing step at a temperature of 600~1200° C. for 30 minutes ~6 hours to obtain said cerium oxide powder.

2. The method as claimed in claim 1, wherein the cerium oxide powder includes crystallites having a mean size of 1 nm-60 nm.

* * * * *